June 13, 1933.  J. G. JACKSON  1,913,552
CONTAINER FOR ELECTRICAL CONDUCTORS
Filed Jan. 12, 1931   2 Sheets-Sheet 1
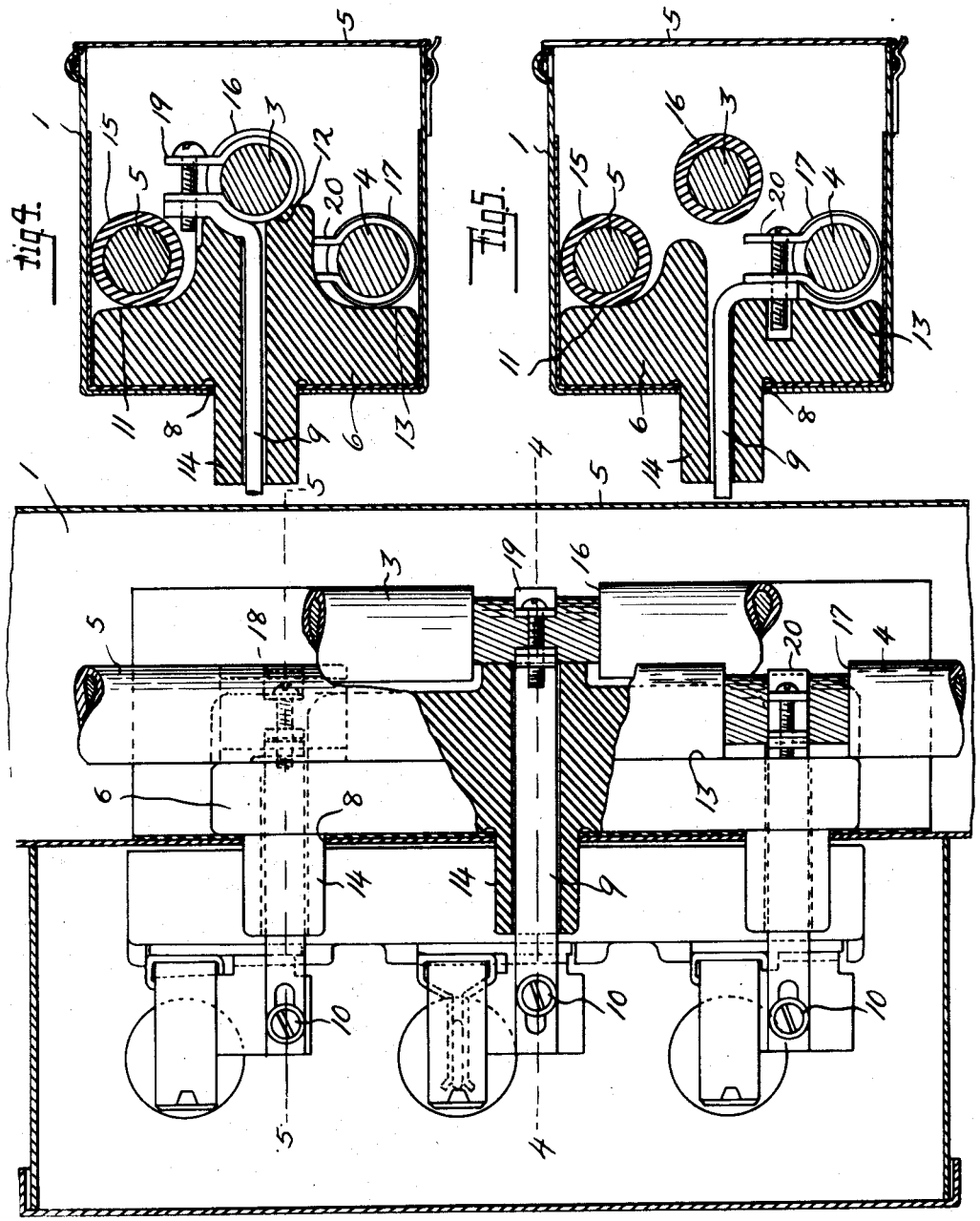
INVENTOR
John G. Jackson June 13, 1933. J. G. JACKSON 1,913,552
CONTAINER FOR ELECTRICAL CONDUCTORS
Filed Jan. 12, 1931 2 Sheets-Sheet 2
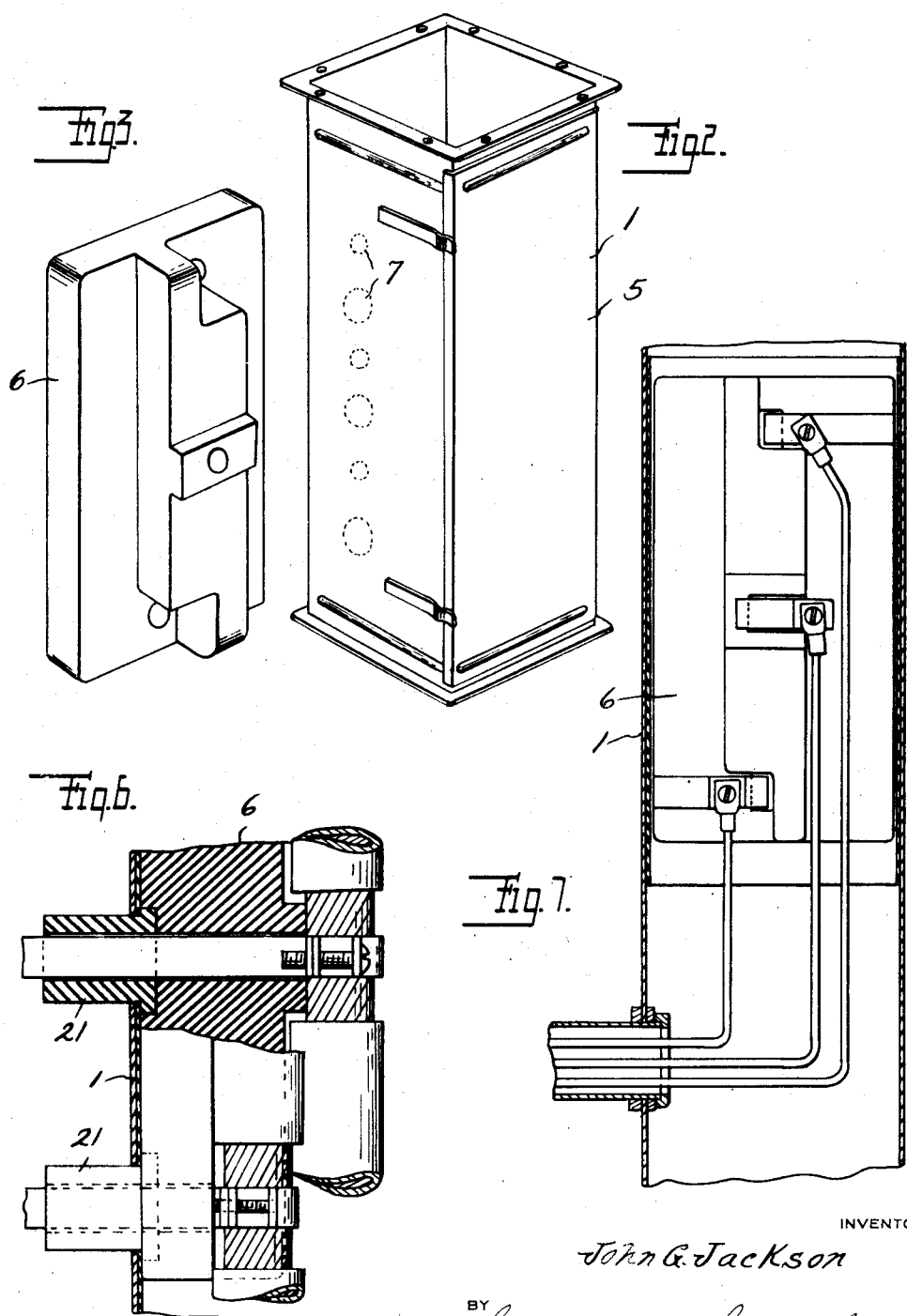

Patented June 13, 1933

1,913,552

UNITED STATES PATENT OFFICE

JOHN G. JACKSON, OF DETROIT, MICHIGAN, ASSIGNOR TO SQUARE D COMPANY, OF DETROIT, MICHIGAN, A CORPORATION OF MICHIGAN

CONTAINER FOR ELECTRICAL CONDUCTORS

Application filed January 12, 1931. Serial No. 508,343.

This invention relates generally to electric distributing systems and refers more particularly to those designed for use in buildings.

Heretofore bus bars in relatively short lengths have been located within enclosures and have been bolted together upon installation, consequently the resulting joints in series not only increased the electrical resistance of the circuit of which such bars formed a part, but also introduced the possibility of poor contact due to the loosening up of some of such joints as a result of vibration and the like. Moreover, such bars required special insulated mountings which added to the expense of installation.

In the present instance, however, the objectionable features just referred to have been overcome by the provision of a system wherein ducts of suitable design contain continuous insulated cables of large size and are provided at spaced points with knock-outs so that connections may be readily made with the cables at convenient points to conduct the current therefrom to its point of use.

In the accompanying drawings:

Figure 1 is a fragmentary elevation of a system embodying my invention;

Figure 2 is a perspective view of the duct per se;

Figure 3 is a perspective view thereof;

Figure 4 is a sectional view taken on the line 5—5 of Figure 1;

Figure 5 is a sectional view taken on the line 6—6 of Figure 1;

Figure 6 is a sectional view showing a slightly modified construction;

Figure 7 is a sectional view showing another modification.

Referring now to the drawings, 1 is a relatively long sheet metal duct of substantially square cross section, and 2, 3 and 4 respectively are large insulated electric cables within said duct. Preferably the duct is provided at one side with a hinged door 5 to permit the insertion at spaced points of the duct of insulator blocks such as 6, and is provided at spaced points of its three other sides with portions 7 that may be knocked out to provide openings 8 through which straps 9 or other suitable conductors may be inserted to establish electrical connections between the cables aforesaid and other electrical devices such as the fuse terminals 10 of electric switches. As shown, the insulator block 6 has suitable seats 11, 12 and 13 respectively for the cables 2, 3 and 4 and has laterally spaced tubular portions 14 extending through the openings 8 in the duct. Portions of the insulation 15, 16 and 17 respectively of the cables 2, 3 and 4 are removed and the straps 9 are connected by clamps 18, 19 and 20 respectively to the exposed portions of said cables. Preferably these straps extend through the tubular portions 14 of the insulator blocks. However, such tubular portions 14 may be dispensed with entirely and the straps may be received in separate insulator bushings such as 21, illustrated in Figure 6, or insulated wires such as 22 may be inserted through the knock-out openings and connected to the cables at the proper points, as illustrated in Figure 7.

Thus with my construction the machinery (not shown) to be electrically operated may be located along the duct and may be electrically connected thereto by merely tapping the cables 2, 3 and 4 at spaced points thereof. Hence the cables conduct the current from a suitable source to approximately the points of use. Inasmuch as the cables are continuous and the connections between the same and the fuse terminals 10 are solderless, it is apparent that joints have been eliminated and the system is more efficient and may be more easily and economically installed.

What I claim as my invention is:

1. In an electric distributing system, an open-ended tube of substantially uniform cross section throughout its length provided in one side with knock-out openings, means within and adjustable longitudinally of the tube to any point thereof for supporting bus bars, including a block of insulating material having a base extending longitudinally of the tube and provided at substantially the longitudinal median line thereof with a longitudinally extending rib, insulating material within the tube beneath and upon opposite sides of the base, bushing means projecting from the block through the insulating material and certain of the knock-out openings, bus bars extending longitudinally of the tube, two of said bars being between the rib and insulating material, and the third extending longitudinally of the rib, and electrical conductors secured to said bus bars and extending outwardly through the block and bushing means aforesaid.

2. In an electric distributing system, an open-ended tube of substantially uniform cross section throughout its length provided in one side with knock-out openings, means within and adjustable longitudinally of the tube to any point thereof for supporting bus bars, including a block of insulating material having a base extending longitudinally of the tube and provided at substantially the longitudinal median line thereof with a longitudinally extending rib, said rib and base having openings in alignment with certain of the knock-out openings, bus bars extending longitudinally of the tube, one on each side of the rib, and one extending longitudinally of the rib, and electrical conductors secured to said bus bars and extending outwardly through the openings in the rib and base and through certain of the knock-out openings in the tube.

3. In an electric distributing system, an open-ended tube of substantially uniform cross section throughout its length provided in one side with knock-out openings, bus bars extending longitudinally of said tube, means within and adjustable longitudinally of the tube for supporting said bus bars, including a block of insulating material having a longitudinally extending rib serving as a seat for one of said bus bars and having longitudinally extending recesses upon opposite sides of the rib receiving the other bus bars, insulating means projecting from the block through certain of the knock-out openings in the tube, and electrical conductors connected to the bus bars and extending through the block and insulating means aforesaid.

4. In an electric distributing system, a closed trough of substantially uniform cross section throughout its length provided in one side with knock-out openings, means within and adjustable longitudinally of the trough to any point thereof for supporting bus bars, including a block of insulating material having a base extending longitudinally of the trough, insulating material within the trough beneath and upon opposite sides of the base, bushing means projecting from the block through the insulating material and certain of the knock-out openings, bus bars extending longitudinally of the trough, two of said bars being between portions of the base and insulating material, and electrical conductors secured to said bus bars and extending outwardly through the block and bushing means aforesaid.

5. In an electric distributing system, a closed trough of substantially uniform cross section throughout its length provided in one side with knock-out openings, means within and adjustable longitudinally of the trough to any point thereof for supporting bus bars, including a block of insulating material having a base extending longitudinally of the trough, said base having openings in alignment with certain of the knock-out openings, bus bars extending longitudinally of the trough and mounted on the base, and electrical conductors secured to said bus bars and extending outwardly through the openings in the base and through certain of the knock-out openings in the trough.

In testimony whereof I affix my signature.

JOHN G. JACKSON.